United States Patent [19]

Espino

[11] 4,021,639
[45] May 3, 1977

[54] DEVICE FOR USE IN INSTALLING WAX FOUNDATIONS IN BEE FRAMES

[76] Inventor: Jesse M. Espino, Country Squire Apartments, P.O. Box 338, Armona, Calif. 93202

[22] Filed: July 28, 1975

[21] Appl. No.: 599,864

[52] U.S. Cl. .............................. 219/201; 6/12 F; 219/50; 219/242; 219/243; 219/385
[51] Int. Cl.² .................... H05B 1/00; A01K 51/00
[58] Field of Search .......... 219/221, 200, 201, 242, 219/234, 243, 218, 385, 386, 50; 6/11, 12 R, 12 F

[56] References Cited

UNITED STATES PATENTS

| 1,233,890 | 7/1917 | Luebeck | 6/12 F |
| 1,373,131 | 3/1921 | Hawkins | 6/12 R |
| 1,726,999 | 9/1929 | Traufler | 6/12 R |
| 1,849,331 | 3/1932 | Muth | 6/12 F |
| 1,974,131 | 9/1934 | Will | 6/12 R |
| 2,383,708 | 8/1945 | Carpenter | 6/12 F |
| 2,673,358 | 3/1954 | Silva | 219/201 X |
| 3,257,934 | 6/1966 | Korr | 219/242 UX |
| 3,438,843 | 4/1969 | Pagel | 219/200 UX |
| 3,669,003 | 6/1972 | King | 219/200 UX |
| 3,683,432 | 8/1972 | Musgrove | 6/11 X |

FOREIGN PATENTS OR APPLICATIONS

| 817,392 | 5/1937 | France | 6/12 R |
| 56,719 | 5/1922 | Sweden | 6/11 |
| 113,300 | 1/1926 | Switzerland | 6/12 R |
| 241,791 | 10/1925 | United Kingdom | 6/12 F |

*Primary Examiner*—A. Bartis

[57] ABSTRACT

A device for use in installing wax foundations in bee frames having side members fabricated from substantially dielectric materials and characterized by a plurality of electrically conductive foundation wires extended in substantial parallelism between the opposite side members. The device includes a table having a planar surface for supporting a bee frame. A pair of elongated electrical contacts of substantially inverted U-shaped configuration are mounted in spaced parallelism on the table for engagement of the mid-portions of the contacts with the opposite ends of the foundation wires whereby a DC voltage can be applied to the wires being embedded in a foundation sheet. The mid-portions of each contact is resilient and compression springs are arranged on the planar surface in supporting relationship with the mid-portions of the contacts to prevent sagging of the mid-portions thereby assuring proper electrical contact between the mid-portions and the foundation wires.

5 Claims, 3 Drawing Figures

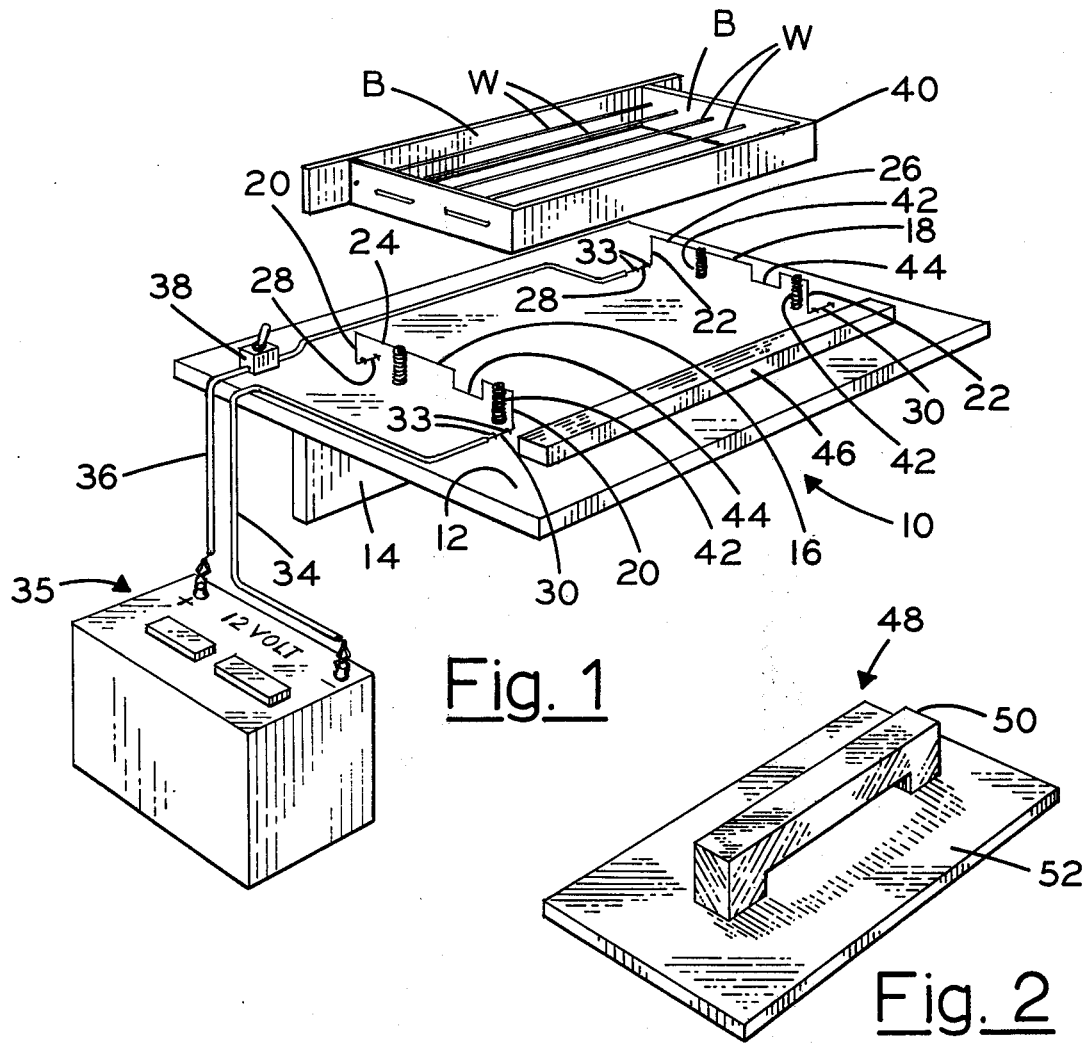
Fig. 1
Fig. 2
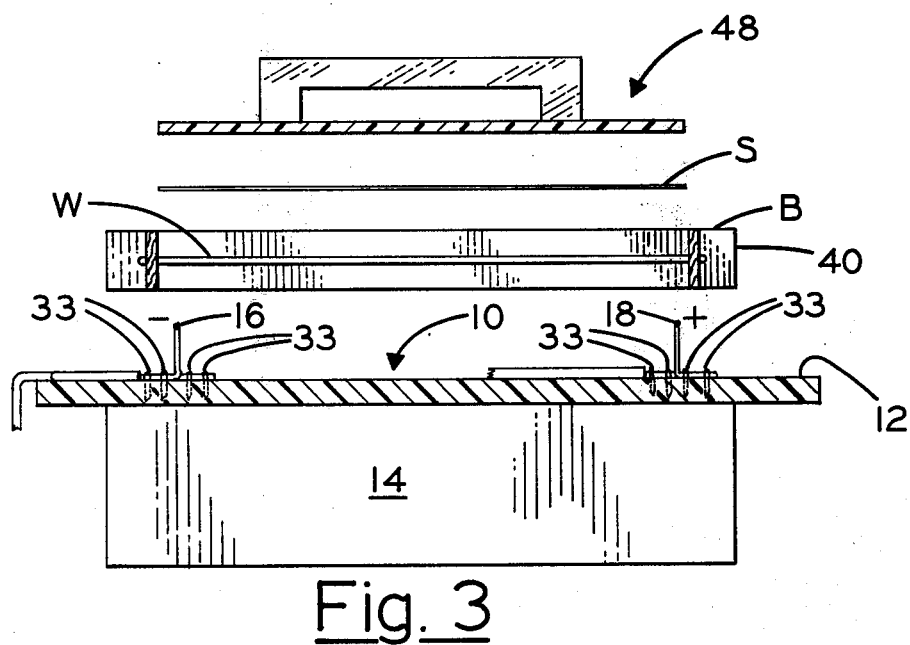
Fig. 3

DEVICE FOR USE IN INSTALLING WAX FOUNDATIONS IN BEE FRAMES

BACKGROUND OF THE INVENTION

1. Field of the Invention

The invention generally relates to devices for use in installing wax foundations in bee frames, and more particularly to a manually operable device which includes an electrical circuit having contacts for applying a d.c. voltage across the foundation wires of the bee frames for thus heating the wires so that the wires are readily embedded in the sheets as the sheets are pressed thereagainst.

2. Description of the Prior Art

As can be appreciated by those familiar with the art of bee keeping, a bee frame normally comprises a rectangular body formed of wood, or a similar dielectric material, having a plurality of foundation wires extended in parallelism between the opposite sides of the body. In order to afford a foundation for honeycombs to be constructed by bees, wax foundations comprising thin sheets of beeswax are adhered to the wires.

Of course, various devices have through the years been employed in mounting wax foundations in bee frames. However, where a bee keeper must service a relatively large number of bee hives, a substantial quantity of time is devoted to mounting the foundations in bee frames. Attempts to reduce the amount of time and effort required in performing this operation have resulted in various devices being proposed for use. Among such devices are those which include a use of alligator clips attached to the foundation wires and an a.c. house current being applied thereto through a step-down transformer.

As should readily be apparent to those familiar with the use of such devices, the use thereof tends to be generally inefficient due to the quantity of time required in connecting the clips to the wires, as well as to the lack of precise control over the tempertures attained by the wires.

It is, therefore, the general purpose of the instant invention to provide a manually operable device for use in rapidly installing wax foundation sheets in bee frames with increased efficiency for thereby reducing the time and skill required of an operator.

OBJECTS AND SUMMARY OF THE INVENTION

It is an object of the instant invention to provide a device for use in installing wax foundation in bee frames which overcomes the aforementioned difficulties and disadvantages.

Another object of the instant invention is to provide a manually operable device which can readily be employed for rapidly affixing wax foundation sheets to bee frames.

It is another object to provide a practical safe and economic device which can readily be employed by bee keepers and the like in affixing wax foundation sheets to bee frames with increased efficiency.

These and other objects and advantages are achieved through the use of a device having a pair of electrical contacts mounted on the upper surface of a work table in spaced parallelism and adapted to receive in engagement therewith the opposite ends of substantially all of the foundation wires of a bee frame and an electrical circuit adapted to apply thereacross a d.c. voltage supplied from a suitable source through a circuit including a manually operable toggle switch, as will become more readily apparent by reference to the following description and claims in light of the accompanying drawings.

BRIEF DESCRIPTION OF THE DRAWINGS

FIG. 1 is an exploded perspective view illustrating a device which embodies the principles of the instant invention and a bee frame to be operated upon employing the device.

FIG. 2 is a perspective view of a manually operable press employed in forcing a foundation sheet into an embedding relationship with foundation wires extended between the opposite sides of the bee frame as the wires are heated, through resistance heating, employing the device shown in FIG. 1.

FIG. 3 is a cross-sectional exploded view illustrating the operation of a device shown in FIG. 1.

DESCRIPTION OF THE PREFERRED EMBODIMENT

Referring now to the drawings wherein like reference characters designate like or corresponding parts throughout the several views, there is shown in FIG. 1 a device, generally designated 10, which embodies the principles of the instant invention. The device 10 has particular utility in affixing wax foundation sheets S to bee frames B having top, bottom and side members and foundation wires W extended between the opposite side members thereof.

The device 10, as shown in FIG. 1, includes a work table 12 formed of a suitable dielectric material, such as wood, chipboard or the like.

The work table 12 is, of course, supported in any suitable manner. As shown, the table is supported by a foot 14 connected therewith through suitable means including screws, brackets and the like. In practice, the foot 12 comprises an elongated member extending substantially the width of the table 12 and serves to support the table 12 at a suitable angle of inclination as it rests upon a supporting surface, such as a work bench or the like.

On the uppermost surface of the table 12 there is mounted a pair of electrical contacts designated 16 and 18, each of which is of a substantially upstanding, inverted U-shaped configuration. The contact 16 includes a pair of vertical segments 20 and a horizontal segment 24 extended therebetween while the contact 18 includes a pair of vertical segments 22 and a horizontal segment 26.

In practice, each of the electrical contacts 16 and 18 is provided with a base segment 28 located at one end thereof and a base segment 30 located at the opposite end through which the contact is rigidly mounted on the table 12. As illustrated in FIG. 3, the base segments 28 and 30 are affixed to the table 12 by a suitable clip. Of course, the particular manner in which the electrical contacts 16 and 18 are affixed to the table 12 can be varied as desired. However, it is to be understood that the contacts are mounted in a fashion such that electrical continuity therebetween normally is interrupted.

Connected to the electrical contact 16, there is an electrical lead 34 which extends to one terminal of a twelve volt battery, designated 35, which functions as a source of d.c. voltage. The opposite terminal of the battery 35 is connected with the electrical contact 18 via a lead 36 within which there is provided a toggle switch 38 adapted to be manipulated for opening and closing an electrical circuit between the battery and the contacts 18. It should, therefore, be apparent that simply by closing the toggle switch 38 an electrical circuit is completed between the opposite terminals of the battery 35 and the contacts 16 and 18.

Each of the bee frames B is formed of a dielectric material such as wood or the like. It is important to note that the width of the side members of the bee frame B is such that the wires W are extended in a plane paralleling the plane of the bee frame and substantially bisecting the side members thereof, and that the longitudinal dimension of the vertical segments 20 and 22 of the contacts 16 and 18 is only slightly greater than the dimension one-half of the members so that as the bee frame is seated on the table 12 the contacts 16 and 18 are brought into an engaging relationship with the wires W. Thus, a d.c. current is caused to flow between the contacts 16 and 18 through the wires W upon a closing of the toggle switch 38. Consequently, a simultaneous resistance heating of the wires W is achieved in response to a closing of the circuit between the contact 18 and the battery 35.

Additionally, it has been found desirable to employ compression springs 42 arranged in supporting relationship with the contacts 16 and 18 for thereby assuring that the contacts do not sag out of an engaging relationship with the wire W during the operation of the device 10. Moreover, each of the horizontal segments 24 and 26, of the contacts 16 and 18, respectively, is provided with a deformed segment 44 of a substantially U-shaped configuration, whereby half-frames, i.e., having depth dimension less than the depth dimension of bee frames B, as shown in FIG. 1, can be seated on the table 12 with the wires W thereof being seated on the contact 16 and 18 so that a voltage can be applied thereacross. Consequently, the segments 44 are employed in instances where foundation sheets S are being installed in so-called half-frames with the bottom end members of the frame being received within the U-shaped segments 44 of the contacts.

In order to facilitate a rapid positioning of the bee frames B on the table 12 with the wires W thereof being seated in engaging relation with the contacts 16 and 18, an elongated stop 46 is affixed to the upper surface of the table in a position such that as a bee frame B is positioned on the table in engagement with the stop 46, the contacts 16 and 18 engage the wires W.

As a practical matter, a manual press 48, having a handle 50 and a planar base 52, is provided for purposes of manually forcing foundation sheets S against foundation wires W, subsequent to a heating of the wires, for thus causing the wires to penetrate the sheets whereby the sheets are caused to adhere to the wires as the wax congeals upon cooling. Of course, the press 48 also is formed of a suitable dielectric material and is suitably dimensioned to be received within the area defined by the top, bottom and side members of the bee frames being operated upon.

OPERATION

It is believed that in view of the foregoing description, the operation of the device will readily be understood and it will be briefly reviewed at this point.

With the device 10 assembled in the manner hereinbefore described and connected with a battery through the leads 34 and 36, the device 10 is prepared for operation.

In operation, a selected bee frame B is seated on the upper planar surface of the table 12 with the wires W thereof being placed in engagement with the electrical contacts 16 and 18. An operator now closes the toggle switch 38 and places a foundation sheet S on the upper surface of the wires W. During this period of time, the wires are heated as an electrical current is caused to flow through the wires between the contacts. The operator now opens the switch 38 while placing the base 52 of the press 48 against the upper surface of the foundation sheet S for applying thereto suitable pressure, whereupon the wires W penetrate the sheet S. Almost simultaneously, the press 48 is removed from engagement with the sheet S and the bee frame B removed from the table 12. Of course, as the bee frame is removed, the wax congeals so that the foundation sheet S becomes affixed to the foundation wires W.

While the toggle switch 38 is illustrated for use in closing an electrical circuit between the battery 12 and the electrical contact 18, it is to be understood that where so desired, other switching devices, including foot-actuated switches, frame-actuated switches, and various timing devices are to be employed.

In view of the foregoing, it should readily be apparent that the device 10 provides a practical solution to the perplexing problem of rapidly and safely installing wax foundations in bee frames of the type formed of substantially dielectric materials, characterized by rectangular configurations and having a plurality of foundation wires extended in substantial parallelism between the opposite sides thereof.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desired to secure by Letters Patent is:

1. A device for use in installing wax foundation sheets in bee frames of the type formed of substantially dielectric material and having a plurality of foundation wires extended in substantial parallelism between a pair of opposite sides of the frames, comprising:
   A. a table including a substantially horizontally planar surface for receiving in supported relation a bee frame characterized by at least one foundation wire extended between the sides of the frame;
   B. means for applying a voltage across the foundation wire of a bee frame supported on said surface including a pair of elongated, resiliently supported electrical contacts mounted on said table in spaced parallelism, each contact of said pair being of a substantially inverted U-shaped configuration having a pair of laterally spaced end portions rigidly affixed to the planar surface of the table and projected substantially vertically therefrom, and a resilient mid-portion integrally related to said end portions and extended in spaced relation with said planar surface; and
   C. means for urging the contacts into engagement with the foundation wire, including a compression spring mounted on said planar surface between the end portions of each of the contacts and disposed in supporting relation with the midportions thereof.

2. The device of claim 1 wherein the midportion of each of said contacts includes an intermediate segment of a substantially upright U-shaped configuration.

3. The device of claim 1 further including circuit means adapted to connect the contacts to the opposite terminals of a d.c. voltage source.

4. The device of claim 3 wherein said circuit means includes a manually operable toggle switch interposed between one of said contacts and one of said terminals.

5. The device of claim 4 further comprising a press adapted to be manipulated for pressing a wax foundation sheet against said foundation wire.

* * * * *

UNITED STATES PATENT AND TRADEMARK OFFICE
CERTIFICATE OF CORRECTION

PATENT NO. : 4,021,639
DATED : May 3, 1977
INVENTOR(S) : Jesse M. Espino

It is certified that error appears in the above-identified patent and that said Letters Patent are hereby corrected as shown below:

In the Abstract, line 12, after "to the wires" and before "being embedded", insert ---to heat the wires prior to the wires---.

Signed and Sealed this twelfth Day of July 1977

[SEAL]

Attest:

RUTH C. MASON
*Attesting Officer*

C. MARSHALL DANN
*Commissioner of Patents and Trademarks*